United States Patent
Schimelpfenig et al.

(10) Patent No.: US 10,687,030 B2
(45) Date of Patent: Jun. 16, 2020

(54) VEHICLE VIDEO RECORDING SYSTEM WITH DRIVER PRIVACY

(71) Applicant: OMNITRACS, LLC, Dallas, TX (US)

(72) Inventors: Andrew Kelly Schimelpfenig, Rogers, AR (US); Thomas Wade Goforth, Carrollton, TX (US)

(73) Assignee: OMNITRACS, LLC, Dallas, TX (US)

( * ) Notice: Subject to any disclaimer, the term of this patent is extended or adjusted under 35 U.S.C. 154(b) by 172 days.

(21) Appl. No.: 15/467,618

(22) Filed: Mar. 23, 2017

(65) Prior Publication Data

US 2018/0278896 A1    Sep. 27, 2018

(51) Int. Cl.
| | |
|---|---|
| G07C 5/08 | (2006.01) |
| H04N 7/18 | (2006.01) |
| H04N 5/77 | (2006.01) |
| H04R 3/00 | (2006.01) |
| H04N 5/76 | (2006.01) |

(52) U.S. Cl.
CPC .......... *H04N 7/188* (2013.01); *G07C 5/0866* (2013.01); *H04N 5/76* (2013.01); *H04N 5/77* (2013.01); *H04N 7/181* (2013.01); *H04N 7/183* (2013.01); *H04R 3/00* (2013.01); *H04R 2460/07* (2013.01); *H04R 2499/13* (2013.01)

(58) Field of Classification Search
CPC .......... H04N 7/188; H04N 7/181; H04N 5/76; H04N 7/183; H04N 5/77; H04R 3/00; H04R 1/08; H04R 2499/13; G07C 5/0866
See application file for complete search history.

(56) References Cited

U.S. PATENT DOCUMENTS

| | | | |
|---|---|---|---|
| 7,555,378 B2 * | 6/2009 | Larschan | G06Q 10/06 701/32.5 |
| 7,874,744 B2 | 1/2011 | Cirker | |
| 7,881,838 B2 * | 2/2011 | Larschan | G06Q 10/06 701/29.2 |
| 7,983,458 B2 * | 7/2011 | Wang | A61B 1/00009 348/699 |
| 8,626,377 B2 * | 1/2014 | Larschan | G07C 5/085 340/937 |
| 8,737,605 B2 | 5/2014 | Choi et al. | |
| 8,855,665 B2 | 10/2014 | Buford et al. | |
| 8,930,072 B1 * | 1/2015 | Lambert | B60R 1/00 701/36 |
| 8,966,654 B1 | 2/2015 | Kwak | |
| 9,229,298 B2 | 1/2016 | Cirker | |
| 2007/0038338 A1 * | 2/2007 | Larschan | G07C 5/008 701/2 |
| 2007/0038351 A1 * | 2/2007 | Larschan | G06Q 10/06 701/33.4 |

(Continued)

FOREIGN PATENT DOCUMENTS

WO    WO 2016/164398 A1    10/2016

OTHER PUBLICATIONS

International Search Report and Written Opinion issued in PCT/US2018/022904 dated Jul. 12, 2018.

*Primary Examiner* — Philip P. Dang
(74) *Attorney, Agent, or Firm* — Arent Fox LLP (57) ABSTRACT

Methods and devices for controlling a camera on a vehicle may include determining a duty status of a driver of the vehicle. The methods and devices may also include controlling a recording status of at least one camera of a camera system on the vehicle based on the duty status.

23 Claims, 4 Drawing Sheets

(56) References Cited

U.S. PATENT DOCUMENTS

| | | | |
|---|---|---|---|
| 2007/0038352 A1* | 2/2007 | Larschan | G06Q 10/06 |
| | | | 701/33.4 |
| 2007/0038353 A1* | 2/2007 | Larschan | G07C 5/085 |
| | | | 701/33.4 |
| 2007/0050108 A1* | 3/2007 | Larschan | G07C 5/085 |
| | | | 701/33.4 |
| 2007/0115378 A1* | 5/2007 | Wang | A61B 1/041 |
| | | | 348/308 |
| 2013/0151027 A1 | 6/2013 | Petrucci et al. | |
| 2013/0311043 A1 | 11/2013 | Kobana et al. | |
| 2014/0098060 A1 | 4/2014 | McQuade et al. | |
| 2014/0300739 A1 | 10/2014 | Mimar | |
| 2015/0189241 A1 | 7/2015 | Kim et al. | |
| 2016/0082897 A1 | 3/2016 | Mouser et al. | |
| 2016/0247153 A1* | 8/2016 | Lesesky | G06Q 20/405 |
| 2016/0291588 A1* | 10/2016 | Ashoori | G01S 19/13 |
| 2016/0316293 A1* | 10/2016 | Klimanis | H04L 12/2823 |
| 2017/0016249 A1* | 1/2017 | Johnson | E05B 39/00 |

\* cited by examiner

VEHICLE VIDEO RECORDING SYSTEM WITH DRIVER PRIVACY

BACKGROUND

The present disclosure relates to video recording and monitoring activities inside and outside of a vehicle.

Drivers of vehicles, and in particular professional drivers of tractor trailers in a fleet, may face many challenges safely navigating vehicles through traffic, congestion, weather and various road conditions. Fleet owners may want to record and monitor activities inside and outside of fleet vehicles while drivers are operating fleet vehicles. Fleet owners may use the video to provide driver training to help prevent future risky behaviors. Professional drivers may also use fleet vehicles as a private residence when the driver is off duty. With the increase in video monitoring both inside and outside of fleet vehicles, the privacy of professional drivers using a fleet vehicle as a private residence is a concern.

Thus, there is a need in the art for improvements in video recording and monitoring activities of vehicles, and in particular, fleet vehicles.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a method. The method may include determining a duty status of a driver of the vehicle. The method may also include controlling a recording status of at least one camera of a camera system on the vehicle based on the duty status.

Another example implementation relates to a computer device. The computer device may include a memory to store data and instructions and a processor in communication with the memory. The computer device may also include a camera privacy manager and a camera control component in communication with the memory and the processor, wherein the camera privacy manager and the camera control components are operable to determine a duty status of a driver of the vehicle, and control a recording status of at least one camera of a camera system on the vehicle based on the duty status.

Another example implementation relates to a computer-readable medium storing instructions executable by a computer device. The computer-readable medium may include at least one instruction for causing the computer device to determine a duty status of a driver of the vehicle. The computer-readable medium may include at least one instruction for causing the computer device to control a recording status of at least one camera of a camera system on the vehicle based on the duty status.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for controlling the recording status of cameras and microphones within a vehicle to preserve driver privacy when a driver is off duty. An owner or manager of one or more vehicles, such as a fleet owner, may want to record and monitor activities inside and outside of the vehicle while drivers are operating the vehicles. While the present disclosure will be discussed using examples relating to a fleet owner and one or more fleet vehicles, it should be understood that the systems and methods described may be utilized by any vehicle owner to monitor driver activity of any vehicle.

For example, fleet owners or managers may want to view video during critical driving events, such as, but not limited to, hard braking, speeding, hard turns, and collisions. By seeing what drivers experience during critical driving events, or at specific dates and times, fleet owners may be able to better understand exactly what occurred. In addition, fleet owners may use the video to provide driving training to help prevent future risky behaviors. In case of an accident or incident fleet owners may be able to quickly determine what caused the incident. The systems and methods may provide video cameras inside and outside the cabin of a fleet vehicles so that video and/or audio monitoring capabilities may be provided inside and outside the cabin during a critical event to capture the conditions external to the vehicle and the corresponding behavior of a driver during a critical event.

However, professional drivers may also use fleet vehicles as a private residence when the driver is off duty. As such, professional drivers may not want to have private activities and/or private conversations recorded when the driver is off duty. The systems and methods of the present disclosure may provide camera and/or audio controls to turn off the cameras and/or audio recorders inside the fleet vehicles when drivers are off duty to preserve driver privacy. In addition, the systems and methods of the present disclosure may provide camera controls to turn on the cameras and/or audio recorders inside the fleet vehicles when the drivers are on duty to capture recordings and/or corresponding audio, for example, during critical events or other specific dates and times for driver training or review. In addition, the systems and method of the present disclosure may also provide camera controls to turn off or on the cameras and/or audio recorders inside the fleet vehicles based on a geographic location of the fleet vehicle and/or based on a entering a geographic area defined by a geo-fence.

Figure 1:
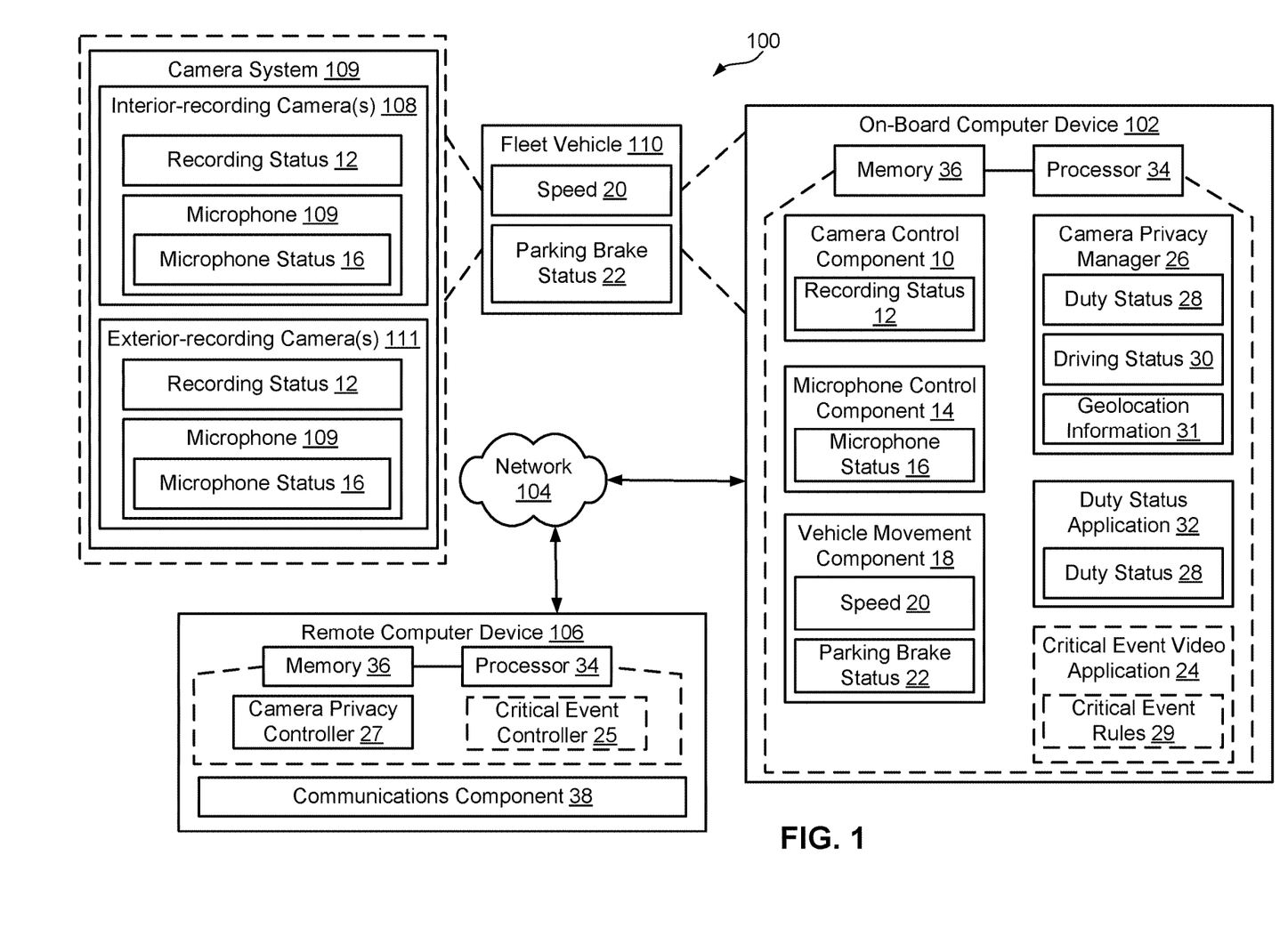
FIG. 1 is a schematic block diagram of an example system for recording and monitoring activities inside and outside of a vehicle in accordance with an aspect.

Referring now to FIG. 1, a system 100 for video recording and monitoring activities inside and outside of a vehicle may include one or more fleet vehicles 110 with at least one on-board computer device 102 having a camera privacy manager 26 for controlling the recording and storage of video (and, optionally, audio) of a driver and/or an interior of fleet vehicle 110 by a camera system 109. Camera system 109 may include one or more interior-recording cameras 108 and/or one or more exterior recording cameras 111. Interior-recording cameras 108 and/or exterior recording cameras 111 may include, but are not limited to, a forward-facing camera, a rear-facing camera, 360 degree cameras, dual cameras (e.g., an integrated interior-recording camera 108 and exterior-recording camera 111), and/or mirror mounted cameras. In some cases, camera privacy manager 26 may operate in coordination with a critical event application 24, which may additionally control the recording and storage of video (and, optionally, audio) of the environment inside and/or around fleet vehicle 110 by camera system 109. On-board computer device 102 may include a processor 34 and/or memory 36. An example of processor 34 can include, but is not limited to, any processor specially programmed as described herein, including a controller, microcontroller, application specific integrated circuit (ASIC), field programmable gate array (FPGA), system on chip (SoC), or other programmable logic or state machine. An example of memory 36 can include, but is not limited to, a type of memory usable by a computer, such as random access memory (RAM), read only memory (ROM), tapes, magnetic discs, optical discs, volatile memory, non-volatile memory, and any combination thereof.

On-board computer device 102 may include any mobile or fixed computer device, which may be connectable in a wired or wireless manner to communication over one or more networks 104. On-board computer device 102 may be, for example, a computer device such as a desktop or laptop or tablet computer, a cellular or satellite telephone, a gaming device, a mixed reality or virtual reality device, a music device, a television, a navigation system, a camera, a personal digital assistant (PDA), a handheld communication device, or any other computer device having wired and/or wireless connection capability with one or more other devices or networks.

In one implementation, on-board computer device 102 may be an electronic logging device (ELD) having a duty status application 32 that keeps track of a duty status 28 of a driver of fleet vehicle 110. For example, duty status 28 may include, but is not limited to, on duty, on duty driving, off duty, off duty driving, sleeper berth, and unknown. Duty status application 32 may keep track of duty status 28 based on an input from a driver to indicate a duty status or a change in duty status, and/or may automatically keep track of a duty status, e.g., based on detected movement of fleet vehicle 110 and/or based on information received from an electronic time keeping device. Additionally, for example, in some implementations, on-board computer device 102 may be an Omnitracs Enterprise Services platform device, such as an Intelligent Vehicle Gateway (IVG) device, or an Omnitracs XRS platform device, each offered by Omnitracs, LLC of Dallas, Tex.

Network 104 may provide one or more types of communication connections, such as any type of wired or wireless airlink, to on-board computer device 102, fleet vehicle 110, interior-recording camera(s) 108, exterior-recording camera(s) 111, and/or microphone(s) 109. For example, interior-recording camera 108 and/or microphone 109 may communicate over a wireless connection, such as a WiFi or Bluetooth connection, or over a wired connection, with on-board computer device 102. Correspondingly, on-board computer device 102 may communicate over a WiFi or cellular or satellite connection with network 104.

Network 104 allows on-board computer device 102 to communicate with one or more remote communication devices 106. In one use case, remote communication device 106 may be a server associated with a network management center run by an operator of system 100, or remote communication device 106 may be a computer device of a vehicle owner, fleet owner, or fleet manager. In either case, the one or more remote communication devices 106 may be used to configure the operation of camera privacy manager 26 and/or critical event video application 24, and/or to receive the resulting recorded video (and/or audio) for storage and/or analysis, such as via communications component 38 and network 104 based on operation of camera privacy controller 27 and critical event controller 25. In this case, camera privacy controller 27 and critical event controller 25 may be computer-implemented instructions, logic, hardware, firmware, or any combination thereof that enable interfacing with, sending commands and configuration data to, and/or receiving recorded video and/or audio or other vehicle-parameter-related data from, on-board computer device 102. Camera privacy controller 27 and critical event controller 25 may be stored and executed by a combination of memory 36 and processor 34 of remote computer device 106.

Fleet vehicles 110 may include a group of one or more vehicles owned or leased by a business, government agency, or other organization or individual. Fleet vehicle 110 may include a camera system 109 of one or more cameras, such as interior-recording camera(s) 108 and/or exterior-recording camera(s) 111. For example, interior-recording camera(s) 108 may be located on fleet vehicle 110 to record the environment inside fleet vehicle 110 (e.g., positioned to record one or more of the driver, the passenger, the dashboard, computer device 102, or anything inside the cab) and exterior-recording camera(s) 111 may be located on fleet vehicle 110 to record the environment outside of fleet vehicle 110 (e.g., positioned to record one or more of an area in front of the vehicle (including the road, other vehicles, etc.), the areas at the sides of the vehicle, or the area behind the vehicle). As such, camera system 109 cameras may record and monitor activities inside and/or outside fleet vehicle 110. In an aspect, fleet vehicle 110 may include a dual camera (e.g., an integrated interior-recording camera 108 and exterior-recording camera 111) located inside a cabin of fleet vehicle 110 so that the dual camera may record and monitor activities inside the cabin of fleet vehicle 110 (e.g., driver behavior) and may record and monitor activities outside the cabin of fleet vehicle 110 (e.g., road and environmental conditions, and activity of other vehicles near fleet vehicle 110).

Each of the one or more interior-recording camera(s) 108 and/or exterior-recording camera(s) 111 may include a microphone 109 to record and monitor activities inside and outside, respectively, of fleet vehicle 110. Each of the one or more interior-recording camera(s) 108 and/or exterior-recording camera(s) 111 may also maintain a recording status 12 that indicates whether each of the one or more interior-recording camera(s) 108 and/or exterior-recording camera(s) 111 is on and recording information or is off and is not recording information. In addition, each microphone 109 may include a microphone status 16 that indicates whether microphone 109 is on and recording information or microphone 109 is off and is not recording information. Each of the one or more interior-recording camera(s) 108 and/or exterior-recording camera(s) 111 and the corresponding microphone(s) 109 may be controlled independently. As such, each of the one or more interior-recording camera(s)

108 and/or exterior-recording camera(s) 111 may or may not be recording video while the corresponding microphone(s) 109 may or may not be recording sound.

On-board computer device 102 may include a camera control component 10 operable to control recording status 12 of each of the one or more interior-recording camera(s) 108 and/or exterior-recording camera(s) 111. In addition, on-board computer device 102 may include a microphone control component 14 operable to control microphone status 16 of each of the one or more microphones 109. When fleet vehicle 110 includes a plurality of cameras 108, 111 and/or microphones 109, each individual camera 108, 111 or microphone 109 may be controlled independently. As such, different cameras 108, 111 and/or microphones 109 may have a different recording status 12 and/or microphone status 16. For example, exterior-recording camera 111 of fleet vehicle 110 may have a recording status 12 of on, while a driver facing interior-recording camera 108 of fleet vehicle 110 may have a recording status 12 of off.

Camera control component 10 and/or microphone control component 14 may communicate with a camera privacy manager 26 to determine the recording status 12 of each of the one or more interior-recording camera(s) 108 and/or exterior-recording camera(s) 111 and/or the microphone status 16 of each microphone 109. Camera privacy manager 26 may apply one or more rules in determining the recording status 12 of each of the one or more interior-recording camera(s) 108 and/or exterior-recording camera(s) 111 and/or the microphone status 16 of each microphone 109. The one or more rules may be based on, for example, the duty status 28 of a driver of fleet vehicle 110. The one or more rules may also be based on a driving status 30 of fleet vehicle 110. The one or more rules may also be based on geolocation information 31 received from fleet vehicle 110.

For example, camera privacy manager 26 may determine duty status 28 of a driver of fleet vehicle 110. As noted above, duty status 28 may include, but is not limited to, on duty, on duty driving, off duty, off duty driving, sleeper berth, and unknown. In an aspect, camera privacy manager 26 may request and receive the duty status 28 from duty status application 32. Duty status application 32 may include, but is not limited to, an hour of service application, an electronic time keeping application, an AOBRD (Automatic On-Board Recording Device), and an ELD. Duty status application 32 may keep track of duty status 28 based on an input from a driver to indicate a duty status or a change in duty status. In addition, duty status application 32 may automatically keep track of a duty status. For example, duty status application 28 may determine a duty status 28 of a driver based on detected movement of fleet vehicle 110 and/or based on electronic time keeping information received from an electronic time keeping device. For example, a driver of fleet vehicle 110 may use on-board computer device 102 and duty status application 32 to update a current duty status 28 of the driver. For example, when the driver is finished driving for the day, the driver may change the current duty status 28 from on duty to off duty using duty status application 32. In another aspect, camera privacy manager 26 may automatically receive the duty status 28 from duty status application 32 that is tracking duty status 28 of a driver, such as based on a change in duty status 28.

Further, for example, camera privacy manager 26 may also determine driving status 30 of fleet vehicle 110. Driving status 30 may include, for example, a movement state of fleet vehicle 110, such as moving or not moving. The movement state of fleet vehicle 110 may be a direct measure of vehicle movement, such as velocity or acceleration, or an indirect vehicle movement-related parameter, such as a brake status. For instance, a brake status may include whether a parking brake is enabled or disabled. Camera privacy manager 26 may communicate with vehicle movement component 18 to determine the movement state of fleet vehicle 110.

Vehicle movement component 18 may receive one or more indicators of the movement state from fleet vehicle 110 to indicate whether fleet vehicle 110 is moving. For example, vehicle movement component 18 may receive the movement state in the form of a speed 20 of fleet vehicle 110. In addition, vehicle movement component 18 may receive the movement state in the form of a parking brake status 22 to indicate whether a parking brake of fleet vehicle 110 is set, e.g., engaged or disengaged. Vehicle movement component 108 may receive the movement state information from one or more monitoring or control devices, such as a controller area network (CANbus) system and/or an Electronic Control Module (ECM), located on fleet vehicle 110. Vehicle movement component 18 may use the received speed 20 information and/or parking brake status 22 to determine the movement state of fleet vehicle 110.

Camera privacy manager 26 may then apply one or more rules or conditions for determining the recording status 12 of each of the one or more interior-recording camera(s) 108 and/or exterior-recording camera(s) 111 and/or microphone status 16 of each microphone 109. For example, the recording status 12 of interior-recording camera(s) 108 may be on when parking brake status 22 is off and the vehicle speed 20 is over zero, as driver privacy would not be expected when fleet vehicle 110 is being operated. As such, interior-recording camera(s) 108 may record and store video when the recording status 12 is on. Another example rule may include turning the recording status 12 of interior-recording camera(s) 108 to off after a predetermined time period (e.g., 10 seconds) when the parking brake is enabled (based on parking brake status 22) on fleet vehicle 110, for instance, to allow driver privacy when fleet vehicle 110 is not being operated. Thus, interior-recording camera(s) 108 may stop recording and storing video when the recording status 12 is off. Another example rule may include turning the recording status 12 of interior-recording camera(s) 108 to on after a predetermined time period (e.g., 5 seconds) when the duty status 28 of the driver changes to on duty and fleet vehicle 110 is moving, as driver privacy would not be expected when the driver is on duty and fleet vehicle 110 is being operated. Another example may include turning the recording status 12 of interior-recording camera(s) 108 to off after a predetermined time period (e.g., 10 seconds) when the duty status 28 of the driver changes to off duty, sleeper berth, or unknown, for instance, to allow driver privacy when the driver is not on duty. Another example rule may include turning the recording status 12 of exterior-recording camera(s) 111 to off when the duty status 28 of the driver changes to off duty, sleeper berth, or unknown, for instance, to allow driver privacy when the driver is not on duty. For example, if the fleet vehicle 110 is parked at the home of the drive while the driver is not on duty, the exterior-recording camera(s) 111 may be turned to off to protect the privacy of the driver at home. Another example rule may include turning the microphone status 16 of microphone 109 of interior-recording camera(s) 108 to off after a predetermined time period when the duty status 28 of the driver changes to off duty, sleeper berth, or unknown, for instance, to allow driver privacy when the driver is not on duty.

In another implementation, which may be an alternative to or combined with the above duty status 28 and/or driving status 30 based rules, another example rule may be based on geographic location, such as turning the recording status 12 of camera 108 to off when the geolocation information 31 indicates that fleet vehicle 110 is in a restricted area or a secured facility, such as, but not limited to, a military base or chemical facility. For example, camera privacy manager 26 may receive the current geolocation information 31 of fleet vehicle 110 from a terrestrial and/or satellite-based positioning system (e.g., Global Positioning System (GPS)) component on fleet vehicle 110. Camera privacy manager 26 may interface with a repository (e.g., in memory 36) of landmarks and/or locations that may be identified as restricted areas or secured facilities. Camera privacy manager 26 may compare the current geolocation information 31 with the repository of landmarks and/or locations to determine whether fleet vehicle 110 is located in a restricted area or secured facility. In another aspect, geofences may be established around restricted areas or secured facilities so that when the current geolocation information 31 of fleet vehicle 110 indicates that fleet vehicle 110 enters into the geofenced area, e.g., a restricted or secured area, camera privacy manager 26 may update the recording status of camera 108 to off. It should be noted that the geofence may be defined based on locations stored in memory 36, and/or based on receiving wireless signals, such as from a radio frequency identification (RFID) device or other wireless transmitter, that identify a geofenced area.

Other example rules for controlling the recording status 12 of each of the one or more interior-recording camera(s) 108 and/or exterior-recording camera(s) 111 and the microphone status 16 of each microphone 109 are illustrated below in the following tables.

An example rule for controlling a recording status 12 of interior-recording camera(s) 108 when duty status 28 changes to "off duty driving," and having camera off and on delays, is illustrated in the below Table 1. In this case, duty status 28 having a "0" value indicates that the driver-facing camera will be commanded to turn off when the driver's duty status changes to Off Duty Driving and a "1" value indicates that the driver-facing camera will be commanded to turn on when the driver's duty status changes to Off Duty Driving.

TABLE 1

Rule to control driver-facing camera upon duty status change to "off duty driving"

| Off Duty Driving | Delay to Turn Camera Off | Delay to Turn Camera On | Camera Status |
|---|---|---|---|
| 0 | Y | X | OFF after Y seconds if not already OFF |
| 1 | Y | X | ON after X seconds if not already ON |

An example rule for controlling a recording status 12 of camera 108 when duty status 28 changes to "on duty," and having camera off and on delays, is illustrated in the below Table 2. In this case, duty status 28 having a "0" value indicates that the driver-facing camera will be commanded to turn off when the driver's duty status change to On Duty Driving, a "1" value indicates that the driver-facing camera will be commanded to turn on when the driver's duty status changes to On Duty, and a "2" value indicates that the driver-facing camera will be commanded to remain in its present recording state when the driver's duty status changes to On Duty. The tertiary option allows, for example, a transition from Off Duty to On Duty to be treated differently than a transition from Driving to On Duty.

TABLE 2

Rule to control driver-facing camera upon duty status change to "on duty"

| On Duty | Delay to Turn Camera Off | Delay to Turn Camera On | Camera Status |
|---|---|---|---|
| 0 | Y | X | OFF after Y seconds if not already OFF |
| 1 | Y | X | ON after X seconds if not already ON |
| 2 | Y | X | Remain in present state |

In Table, 2, by having an option (e.g., duty status 28 having the value of "2") to have the recording status 12 of interior-recording camera 108 remain in the present state, the previous state may control the recording status 12 of interior-recording camera 108. For example, if the driver changed the duty status 28 from "off duty" to "on duty," the recording status 12 of interior-recording camera 108 would remain off because the driver may be still preparing to drive. However, if the driver or on-board computer device 102 (e.g., HOS application 24) changes the duty status 28 from "driving" to "on duty" because the fleet vehicle 110 remained still for a period of time, for example, 5 minutes, the interior-recording camera 108 would continue to record video because the driver is still working.

An example rule for controlling a recording status 12 of interior-recording camera 108 when duty status 28 changes to "on duty driving" is illustrated in the below Table 3.

TABLE 3

Rule to control driver-facing camera upon duty status change to "on duty driving"

| On Duty Driving | Delay to Turn Camera Off | Delay to Turn Camera On | Camera Status |
|---|---|---|---|
| 0 | Y | X | OFF after Y seconds if not already OFF |
| 1 | Y | X | ON after X seconds if not already ON |

An example rule for controlling a microphone status 16 of microphone 109 when duty status 28 changes to "off duty driving" is illustrated in the below Table 4.

TABLE 4

Rule to control driver-facing camera microphone upon duty status change to "off duty driving"

| Off Duty Driving) | Delay to Turn Camera Off | Delay to Turn Camera On | Microphone Status |
|---|---|---|---|
| 0 | Y | X | OFF after Y seconds if not already OFF |
| 1 | Y | X | ON after X seconds if not already ON |

An example rule for controlling a microphone status 16 of microphone 109 when duty status 28 changes to "on duty" is illustrated in the below Table 5.

TABLE 5

Rule to control driver-facing camera microphone upon duty status change to "on duty"

| On Duty | Delay to Turn Camera Off | Delay to Turn Camera On | Microphone Status |
|---|---|---|---|
| 0 | Y | X | OFF after Y seconds if not already OFF |
| 1 | Y | X | ON after X seconds if not already ON |
| 2 | Y | X | Remain in present state |

By having an option to have the microphone status 16 of microphone 109 remain in the present state, the previous state may control the microphone status 16 of microphone 109. For example, if the driver changed his status from "off duty" to "on duty," the microphone status 16 of microphone 109 would remain off because the driver may be still preparing to drive. However, if the driver or the ELD changes his status from "driving" to "on duty" because the fleet vehicle 110 remained still for a period of time, for example, 5 minutes, the microphone 109 would continue to record video because the driver is still working.

An example rule for controlling a microphone status 16 of microphone 109 when a duty status 28 changes to "on duty driving" is illustrated in the below Table 6.

TABLE 6

Rule to control driver-facing camera microphone upon duty status change to "on duty driving"

| On Duty Driving | Delay to Turn Camera Off | Delay to Turn Camera On | Microphone Status |
|---|---|---|---|
| 0 | Y | X | OFF after Y seconds if not already OFF |
| 1 | Y | X | ON after X seconds if not already ON |

An example rule for controlling a recording status 12 of interior-recording camera 108 when driving status 30 changes, based on ignition and parking brake states, along with camera on and off delays, is illustrated in the below Table 7.

TABLE 7

Rule to control driver-facing camera upon driving status changes

| Ignition | Parking Brake | Delay to Turn Camera On | Delay to Turn Camera Off | Camera Status |
|---|---|---|---|---|
| Enabled | Enabled | X | Y | OFF after Y seconds |
| Enabled | Disabled | X | Y | ON after X seconds |
| Disabled | Enabled | X | Y | OFF after Y seconds |
| Disabled | Disabled | X | Y | OFF after Y seconds |

An example rule for controlling a microphone status 16 of microphone 109 when driving status 30 changes, based on ignition and parking brake states, along with camera on and off delays, is illustrated in the below Table 8.

TABLE 8

Rule to control driver-facing camera microphone upon driving status changes

| Ignition | Parking Brake | Delay to Turn Camera On | Delay to Turn Camera Off | Microphone Status |
|---|---|---|---|---|
| Enabled | Enabled | X | Y | OFF after Y seconds |
| Enabled | Disabled | X | Y | ON after X seconds |
| Disabled | Enabled | X | Y | OFF after Y seconds |
| Disabled | Disabled | X | Y | OFF after Y seconds |

As mentioned above, on-board computer device 102 may also include critical event video application 24 operable to cause video (and audio) to be recorded, and to enable retrieval of recorded video (and audio) from interior-recording camera(s) 108 and/or exterior-recording camera(s) 111. For example, critical event video application 24 may be configured with one or more critical event rules 29 that trigger interior-recording camera(s) 108 and/or exterior-recording camera(s) 111 to record video (and/or audio). Critical event rules may include detection of one or more critical events associated with the operation of fleet vehicle 110. Suitable examples of a critical event may include, but is not limited to, one or any combination of hard braking, the use of the anti-lock braking system (ABS), roll stability state, a lane departure warning, and a following time violation. A following time violation may include when a quotient of a distance to the vehicle in front of the fleet vehicle 110 (as measured by, for example, a radar system) divided by the speed of fleet vehicle 110 is less than a configurable number of seconds for a configurable period of time (e.g., 2 seconds for 2 minutes).

Critical event rules 29 may additionally include rules on a how long recording should be maintained, and/or rules on uploading or providing access to the recorded video (and/or audio). Further, critical event rules 29 may specify other vehicle parameter information that is to be collected (e.g., from a CANbus or ECM) along with the video and/or audio from one of more internal cameras 108 and/or external cameras 111. Critical event controller 25 at remote computer device 106 can configure one or more critical event rules 29, and/or can generate a request for video to be sent to on-board computer device 102 in response to a user request (e.g., for video associated with a critical event, or for video associated with a specific date/time). In some cases where interior-recording camera(s) 108 and/or exterior-recording camera(s) 111 may be recording continuously, the amount of video retrieved before and/or after a critical event may be configured by a user or may be predetermined by critical event controller 25 or critical event video application 24. Critical event video application 24 may retrieve and upload video automatically upon the occurrence of one or more critical events. Thus, fleet owners or managers, via operation of critical event controller 25 at remote computer device 106, may receive reliable information quickly to help identify a cause of the critical event, help defend a driver who was involved in an accident, and/or to identify unacceptable driving behaviors.

Because camera privacy manager 26 may communicate with camera control component 10 and/or microphone control component 14 to update the recording status 12 of interior-recording camera(s) 108 and/or exterior-recording camera(s) 111 or microphone status 16 of each microphone 109 based on one or more of the duty status 28 and/or the driving status 30, when critical event video application 24 retrieves and uploads video based on the critical event rules 29 and/or in response to a user request, driver privacy may be maintained because interior-recording camera(s) 108 and/or exterior-recording camera(s) 111 may be inactive when the driver uses the fleet vehicle 110 as a private residence or based on one or video recording rules designed to ensure driver privacy.

In another aspect, instead of camera privacy manager 26 controlling the recording status 12 of interior-recording camera(s) 108 and/or exterior-recording camera(s) 111 or each microphone 109 based on the duty status 28 and/or driving status 30, camera privacy manager 26 may communicate with critical event video application 24 to prevent video being retrieved from interior-recording camera(s) 108 and/or exterior-recording camera(s) 111 during the time periods the duty status 28 changes to off duty, sleeper berth, or unknown to preserve driver privacy.

Figure 2:
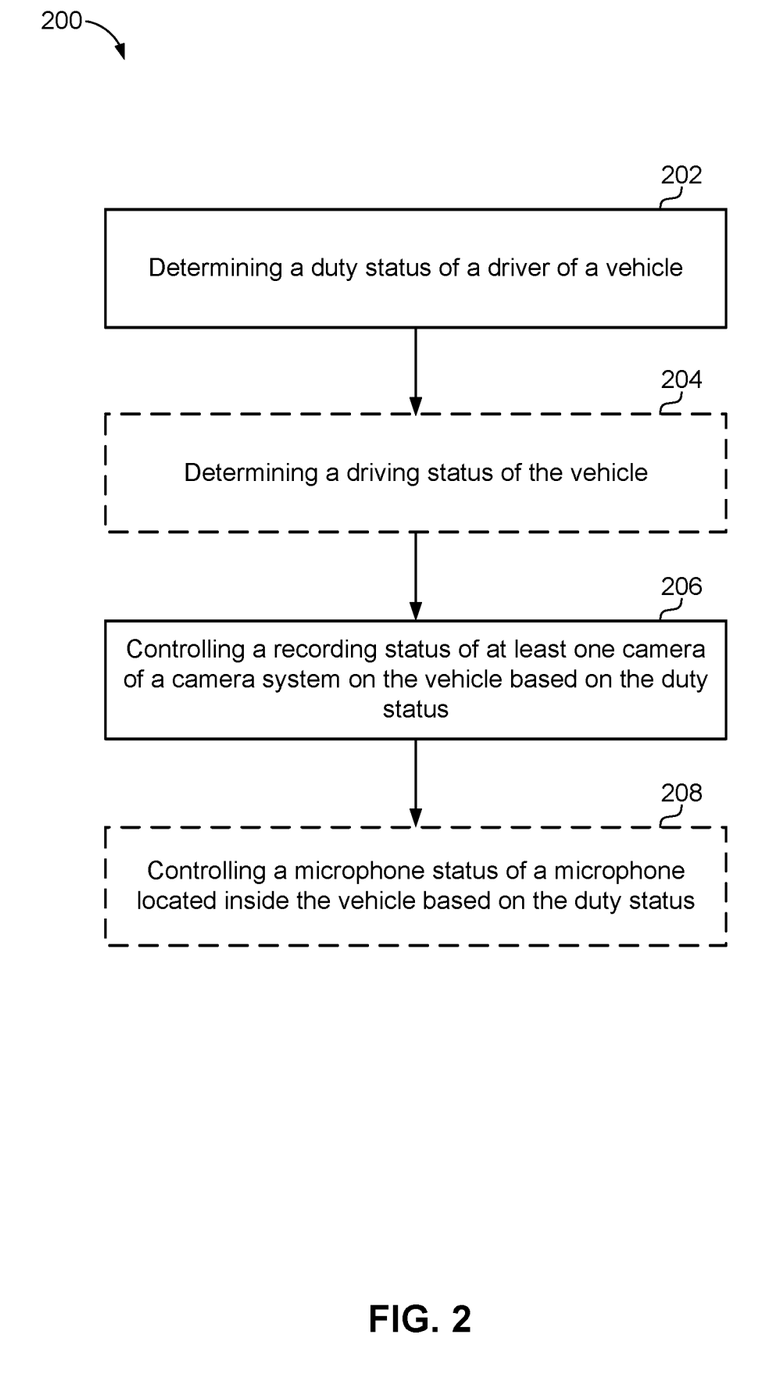
FIG. 2 is a flow chart of a method for controlling a camera and a microphone in a vehicle in accordance with an aspect.

Referring now to FIG. 2, a method 200 for controlling a recording status of a camera and/or a microphone on a vehicle may be executed by on-board computer device 102 (FIG. 1).

At 202, method 200 may include determining a duty status of a driver of a vehicle. A duty status may include, for example, on duty, on duty driving, off duty, off duty driving, sleeper berth, and unknown. Camera privacy manager 26 may determine a duty status 28 of a driver of fleet vehicle 110. Camera privacy manager 26 may request and receive the duty status 28 from duty status application 32. A driver of fleet vehicle 110 may use on-board computer device 102 and duty status application 32 to update a current duty status 28 of the driver. For example, when the driver is finished driving for the day, the driver may change the current duty status 28 from on duty to off duty using duty status application 32. In another aspect, camera privacy manager 26 may automatically receive the duty status 28 from duty status application 32 that is tracking the duty status 28 of a driver, such as based on a change in duty status 28 and/or from an electronic time keeping device. In another aspect, camera privacy manager 26 may receive the duty status 28 from an electronic logging device (ELD) tracking a number of hours the driver has driven.

At 204, method 200 may optionally include determining a driving status of the vehicle. For example, in one implementation, camera privacy manager 26 may determine a driving status 30 of fleet vehicle 110. Driving status 30 may include, for example, a movement state of fleet vehicle 110, such as moving or not moving. The movement state of fleet vehicle 110 may be a direct measure of vehicle movement, such as velocity or acceleration, or an indirect vehicle movement-related parameter, such as a brake status. For instance, a brake status may include whether a parking brake is enabled or disabled. Camera privacy manager 26 may communicate with vehicle movement component 18 to determine the movement state of fleet vehicle 110.

At 206, method 200 may include controlling a recording status of at least one camera of a camera system on the vehicle based on the duty status. Fleet vehicle 110 may include a camera system 109 with a plurality of cameras, such as one or more interior-recording camera(s) 108 and/or one or more exterior-recording cameras 111. In addition, one or more cameras on fleet vehicle 110 may be a dual camera that integrates interior-recording camera 108 and exterior-recording camera 111 so that the dual camera may record and monitor activities inside the cabin of fleet vehicle 110 and may record and monitor activities outside the cabin of fleet vehicle 110. A recording status 12 of interior-recording camera 108, exterior-recording camera 111, and/or dual camera may include on or off.

A camera control component 10 may control a recording status 12 of cameras in camera system 109. For example, camera control component 10 may control one or more interior-recording camera(s) 108 and/or one or more exterior-recording cameras 111. Camera control component 10 may communicate with a camera privacy manager 26 to determine the recording status 12 of one or more interior-recording camera(s) 108 and one or more exterior-recording cameras 111. Camera privacy manager 26 may apply one or more rules or conditions in determining the recording status 12 of each of one or more interior-recording camera(s) 108 and one or more exterior-recording cameras 111. The one or more rules may be based on, for example, a duty status 28 of a driver of fleet vehicle 110 and, optionally, a driving status 30 of fleet vehicle 110. An example rule may include turning the recording status 12 of one or more interior-recording camera(s) 108 and/or one or more exterior-recording cameras 111 to off after a predetermined time period (e.g., 5 seconds) when the duty status 28 of the driver changes to off duty, sleeper berth, or unknown. Another rule may include turning the recording status 12 of one or more interior-recording camera(s) 108 and/or one or more exterior-recording camera(s) 111 to off after a predetermined time period (e.g., 10 seconds) when the parking brake is enabled on fleet vehicle 110. Thus, one or more interior-recording camera(s) 108 and/or one or more exterior-recording camera(s) 111 may stop recording and storing video when the recording status 12 is off. Another rule may include turning the recording status 12 of one or more interior-recording camera(s) 108 and/or one or more exterior-recording camera(s) 111 to on when the duty status 28 of the driver changes to on duty or on duty driving. As such, one or more interior-recording camera(s) 108 and/or one or more exterior-recording camera(s) 111 may record and store video when the recording status 12 is on.

At 208, optionally, method 200 may include controlling a microphone status of a microphone located inside the vehicle based on the duty status. Microphone control component 14 may control a microphone status 16 of microphone 109. Microphone control component 14 may communicate with a camera privacy manager 26 to determine the microphone status 16 of microphone 109. Camera privacy manager 26 may apply one or more rules or conditions in determining the microphone status 16 of microphone 109. The one or more rules may be based on, for example, a duty status 28 of a driver of fleet vehicle 110 and, optionally, a driving status 30 of fleet vehicle 110. One example rule may include turning the microphone status 16 of microphone 109 to off after a predetermined time period when the duty status 28 of the driver changes to off duty, sleeper berth, or unknown.

Figure 3:
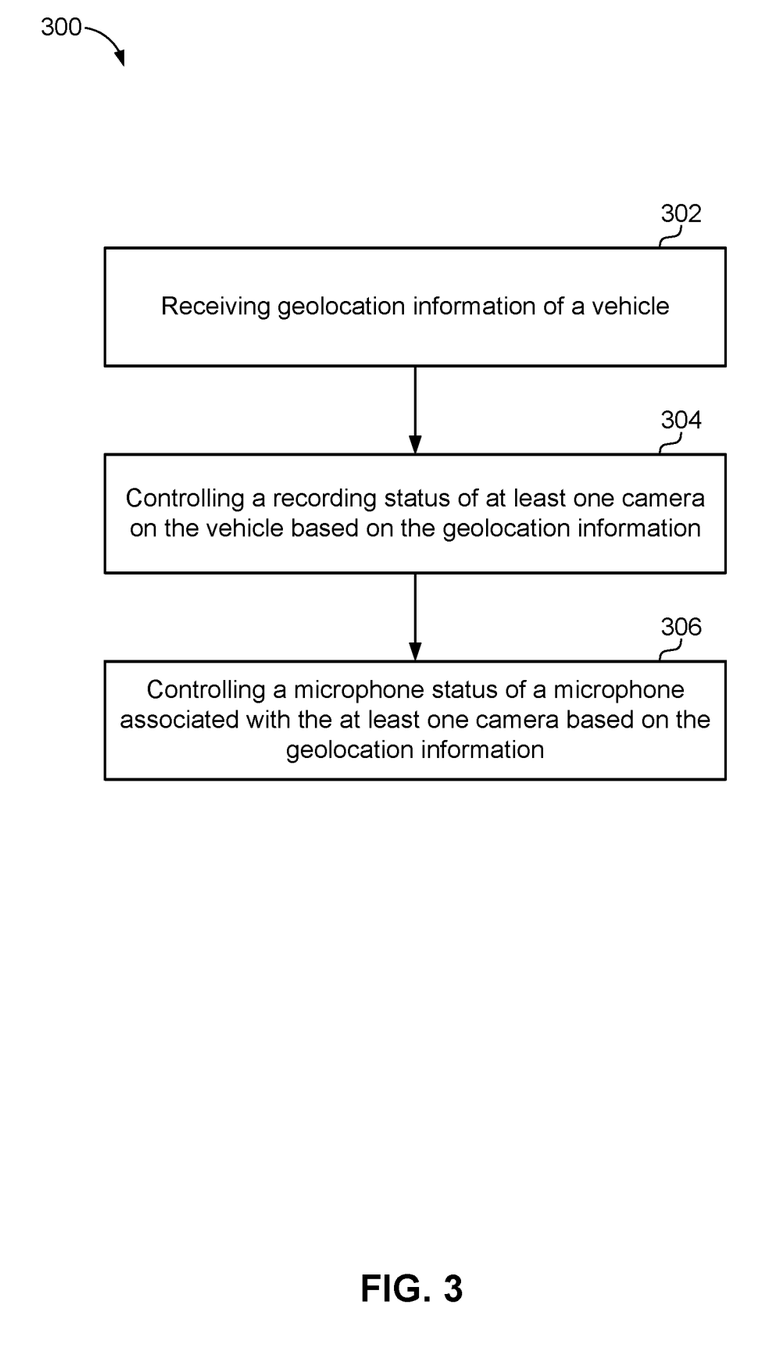
FIG. 3 is a flow chart of a method for controlling a camera and a microphone in a vehicle based on geolocation information in accordance with an aspect.

Referring now to FIG. 3, a method 300 for controlling a recording status of a camera and/or a microphone on a fleet vehicle based on the geolocation of the fleet vehicle may be executed by on-board computer device 102 (FIG. 1). It should be noted that method 300 may be executed in conjunction with method 200 such that the geographic location of fleet vehicle 110 is another factor that determines whether or not a camera and/or microphone are turned on or off.

At 302, method 300 may include receiving geolocation information of a vehicle. For example, camera privacy manager 26 may receive the current geolocation information 31 of fleet vehicle 110 from a terrestrial and/or satellite-based positioning system component on fleet vehicle 110.

At 304, method 300 may include controlling a recording status of at least one camera on the vehicle based on the geolocation information. Camera privacy manager 26 may determine that the recoding status 12 of one or more cameras in camera system 109, such as one or more interior-recording camera(s) 108 and/or one or more exterior-recording camera(s) 111 may need to change based on the geolocation information 31 of fleet vehicle 110. For example, if the geolocation information 31 indicates that fleet vehicle 110 may be in a restricted area or a secured facility, such as, but not limited to, a military base or chemical facility, camera privacy manager 26 may notify camera control component 10 that the recording status 12 of one or more interior-recording camera(s) 108 and/or one or more exterior-recording cameras 111 should be changed to off, if the current recording status 12 of the respective camera is on. As such, one or more interior-recording camera(s) 108 and/or one or more exterior-recording camera(s) 111 may stop recording and storing video when the recording status 12 is off. Another example may include, if the geolocation information 31 indicates that fleet vehicle 110 may be on a highway or road, camera privacy manager 26 may notify camera control component 10 that the recording status 12 of one or more interior-recording camera(s) 108 and/or one or more exterior-recording cameras 111 should be changed to on, if the current recording status 12 of the respective camera is off.

At 306, method 300 may include controlling a microphone status of a microphone associated with the at least one camera based on the geolocation information. Camera privacy manager 26 may determine that the microphone status 16 of microphone 109 may need to change based on the geolocation information 31 of fleet vehicle 110. For example, if the geolocation information 31 indicates that fleet vehicle 110 may be in a restricted area or a secured facility, camera privacy manager 26 may notify microphone control component 14 that the microphone status 16 of microphone 109 should be changed to off, if microphone 109 is not already off.

Figure 4:
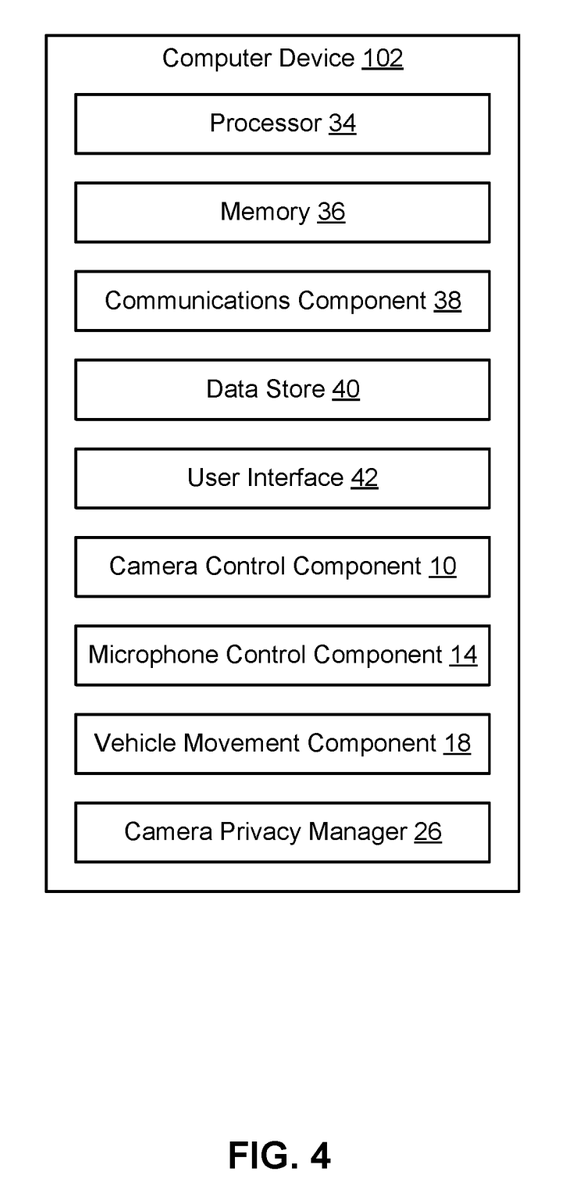
FIG. 4 is a schematic block diagram of an example computer device for controlling a camera and a microphone in a vehicle in accordance with an implementation of the present disclosure.

Referring now to FIG. 4, illustrated is an example on-board computer device 102 in accordance with an implementation, including additional component details as compared to FIG. 1. In one example, on-board computer device 102 may include processor 34 for carrying out processing functions associated with one or more components and functions described herein. Processor 34 can include a single or multiple set of processors or multi-core processors. Moreover, processor 34 can be implemented as an integrated processing system and/or a distributed processing system.

On-board computer device 102 may further include memory 36, such as for storing local versions of applications being executed by processor 34. Memory 36 can include a type of memory usable by a computer, such as random access memory (RAM), read only memory (ROM), tapes, magnetic discs, optical discs, volatile memory, non-volatile memory, and any combination thereof.

Further, on-board computer device 102 may include a communications component 38 that provides for establishing and maintaining communications with one or more parties utilizing hardware, software, and services as described herein. Communications component 38 may carry communications between components on on-board computer device 102, as well as between on-board computer device 102 and external devices, such as devices located across a communications network and/or devices serially or locally connected to on-board computer device 102. For example, communications component 38 may include one or more buses, and may further include transmit chain components and receive chain components associated with a transmitter and receiver, respectively, operable for interfacing with external devices.

Additionally, on-board computer device 102 may include a data store 40, which can be any suitable combination of hardware and/or software, that provides for mass storage of information, databases, and programs employed in connection with implementations described herein. For example, data store 40 may be a data repository for camera control component 10 (FIG. 1), microphone control component 14 (FIG. 1), vehicle movement component 18 (FIG. 1), critical event video application 24 (FIG. 1), camera privacy manager 26 (FIG. 1), and/or duty status application 32 (FIG. 1).

On-board computer device 102 may also include a user interface component 42 operable to receive inputs from a user of on-board computer device 102 and further operable to generate outputs for presentation to the user. User interface component 42 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 42 may include one or more output devices, including but not limited to a display, a speaker, a haptic feedback mechanism, a printer, any other mechanism capable of presenting an output to a user, or any combination thereof.

In an implementation, user interface component 42 may transmit and/or receive messages corresponding to the operation of camera control component 10, microphone control component 14, vehicle movement component 18, critical event video application 24, camera privacy manager 26, and/or duty status application 32. In addition, processor 34 executes camera control component 10, microphone control component 14, vehicle movement component 18, critical event video application 24, camera privacy manager 26, and/or duty status application 32, and memory 36 or data store 40 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., on-board computer device 102), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, a mixed reality or virtual reality device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of controlling a camera system on a vehicle, comprising:
determining, by a processor, a duty status of a driver of the vehicle;
applying, by the processor, one or more rules based at least upon the duty status of the driver for determining a recording status of at least one interior-recording camera and at least one exterior-recording camera of the camera system, wherein the recording status includes an on status corresponding to recording and an off status corresponding to not recording;
controlling, by the processor, the recording status of the at least one interior-recording camera and the at least one exterior-recording camera based on the one or more applied rules, wherein the camera system records activities inside the vehicle and outside the vehicle;
detecting, by the processor, a critical event;
changing, by the processor, the recording status of the at least one interior-recording camera and the at least one exterior-recording camera to the on status when the critical event is triggered even when the duty status is one or more of off duty, sleeper berth, or unknown; and setting, by the processor, the recording status of the at least one interior-recording camera and the recording status of the at least one exterior-recording camera to the off status when geolocation of the vehicle indicates the vehicle is in a restricted area or a secured facility.

2. The method of claim 1, further comprising:
stopping recording of the at least one interior-recording camera when the duty status is off duty.

3. The method of claim 2, wherein controlling the recording status of the at least one interior-recording camera further comprises setting the recording status of the at least one interior-recording camera to the off status when the duty status is one or more of sleeper berth or unknown.

4. The method of claim 1, further comprising:
starting recording of the at least one interior-recording camera when the duty status is one or more of on duty or on duty driving.

5. The method of claim 1, further comprising:
determining a driving status of the vehicle; and
wherein controlling the recording status of the at least one interior-recording camera further comprises setting the recording status of the at least one interior-recording camera to the off status when the driving status indicates a parking brake enabled.

6. The method of claim 1, further comprising:
receiving the duty status from a duty status application that keeps track of a driver status.

7. The method of claim 1, further comprising:
controlling a microphone status of a microphone located inside the vehicle based on the duty status and a driving status.

8. The method of claim 1, wherein the one or more applied rules are further based upon a driving status of the vehicle and geolocation of the vehicle.

9. The method of claim 1, wherein the one or more applied rules include a period of time to delay a change in the recording status of the at least one interior-recording camera.

10. The method of claim 1, wherein the duty status is based on detected movement of the vehicle.

11. A computer device, comprising:
a memory to store data and instructions that define a camera privacy manager and a camera control component;
a processor in communication with the memory;
wherein the processor is configured to execute the camera privacy manager and the camera control component to:
determine a duty status of a driver of a vehicle;
apply one or more rules based at least upon the duty status of the driver for determining a recording status of at least one interior-recording camera and at least one exterior-recording camera of a camera system on the vehicle, wherein the recording status includes an on status corresponding to recording and an off status corresponding to not recording;
control the recording status of the at least one interior-recording camera and the at least one exterior-recording camera based on the one or more applied rules, wherein the camera system records activities inside the vehicle and outside the vehicle;
detect a critical event;
change the recording status of the at least one interior-recording camera and the at least one exterior-recording camera to the on status when the critical event is triggered even when the duty status is one or more of off duty, sleeper berth, or unknown; and
set the recording status of the at least one interior-recording camera and the recording status of the at least one exterior-recording camera to the off status when geolocation of the vehicle indicates the vehicle is in a restricted area or a secured facility.

12. The computer device of claim 11, wherein the processor is configured to execute the camera control component to stop the recording of the at least one interior-recording camera when the duty status is off duty.

13. The computer device of claim 12, wherein the processor is configured to execute the camera control component to set the recording status of the at least one interior-recording camera to the off status when the duty status is one or more of sleeper berth or unknown, and
wherein the processor is configured to execute the camera control component to set the recording status of the at least one interior-recording camera to on when the duty status is one or more of on duty or on duty driving.

14. The computer device of claim 11, wherein the processor is configured to execute the camera privacy manager to determine a driving status of the vehicle and the processor is configured to execute the camera control component to set the recording status of the at least one interior-recording camera to the off status when the driving status indicates a parking brake enabled.

15. The computer device of claim 11, wherein the duty status is received from a duty status application that keeps track of a driver status.

16. The computer device of claim 11, further comprising:
a microphone control component defined in the memory and wherein the processor is configured to execute the microphone control component to control a microphone status of a microphone located inside the vehicle based on the duty status and a driving status.

17. The computer device of claim 11, wherein the processor is configured to execute the camera control component to start recording of the at least one interior-recording camera when the duty status is one or more of on duty or on duty driving.

18. A non-transitory computer-readable medium storing instructions executable by a computer device, comprising:
at least one instruction for causing the computer device to determine a duty status of a driver of a vehicle;
at least one instruction for causing the computer device to apply one or more rules based at least upon the duty status of the driver for determining a recording status of at least one interior-recording camera and at least one exterior-recording camera of a camera system on the vehicle, wherein the recording status includes an on status corresponding to recording and an off status corresponding to not recording;
at least one instruction for causing the computer device to control the recording status of the at least one interior-recording camera and the at least one exterior-recording camera based on the one or more applied rules, wherein the camera system records activities inside the vehicle and outside the vehicle;
at least one instruction for causing the computer device to detect a critical event;
at least one instruction for causing the computer device to change the recording status of the at least one interior-recording camera and the at least one exterior-recording camera to the on status when the critical event is triggered even when the duty status is one or more of off duty, sleeper berth, or unknown; and at least one instruction for causing the computer device to set the recording status of the at least one interior-recording camera and the recording status of the at least one exterior-recording camera to the off status when geolocation of the vehicle indicates the vehicle is in a restricted area or a secured facility.

19. The non-transitory computer-readable medium of claim 18, further comprising:
at least one instruction to stop recording of the at least one interior-recording camera when the duty status is off duty.

20. The non-transitory computer-readable medium of claim 19, wherein controlling the recording status of the at least one interior-recording camera further comprises setting the recording status of the at least one interior-recording camera to the off status when the duty status is one or more of sleeper berth or unknown.

21. The non-transitory computer-readable medium of claim 18, further comprising:
at least one instruction to start recording of the at least one interior-recording camera when the duty status is one or more of on duty or on duty driving.

22. The non-transitory computer-readable medium of claim 18, further comprising:
at least one instruction to determine a driving status of the vehicle; and
wherein controlling the recording status of the at least one interior-recording camera further comprises setting the recording status of the at least one interior-recording camera to the off status when the driving status indicates a parking brake enabled.

23. The non-transitory computer-readable medium of claim 18, further comprising:
at least one instruction to receive the duty status from a duty status application that keeps track of a driver status.

* * * * *